US012085975B2

(12) United States Patent
Wu et al.

(10) Patent No.: US 12,085,975 B2
(45) Date of Patent: Sep. 10, 2024

(54) FLEXIBLE LIMITING MECHANISM

(71) Applicant: AAC Microtech (Changzhou) Co., Ltd., Jiangsu (CN)

(72) Inventors: Jinguo Wu, Changzhou (CN); Feng Yan, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 18/325,079

(22) Filed: May 29, 2023

(65) Prior Publication Data

US 2024/0272669 A1 Aug. 15, 2024

Related U.S. Application Data

(63) Continuation of application No. PCT/CN2023/080664, filed on Mar. 10, 2023.

(30) Foreign Application Priority Data

Feb. 14, 2023 (CN) ........................ 202310113747.7

(51) Int. Cl.
*G05G 5/04* (2006.01)

(52) U.S. Cl.
CPC ........... *G05G 5/04* (2013.01); *G05G 2505/00* (2013.01)

(58) Field of Classification Search
CPC ................................................ G05G 2505/00
See application file for complete search history.

(56) References Cited

U.S. PATENT DOCUMENTS 2,744,416 A * 6/1956 Feigin ..................... F16H 35/00 188/69
3,012,447 A * 12/1961 Wallace ................... G05G 5/04 192/139
4,794,814 A * 1/1989 Ferguson, Jr. ........... G05G 5/04 74/526
4,815,339 A * 3/1989 Bonadies ............ B23Q 16/001 192/139
9,551,378 B2 * 1/2017 Delaby ................... F16C 19/04
10,817,011 B2 * 10/2020 Fang ...................... F16M 11/06

* cited by examiner

*Primary Examiner* — Vicky A Johnson
(74) *Attorney, Agent, or Firm* — W&G Law Group

(57) ABSTRACT

A limiting mechanism is provided, including: a base; a first bearing; a turntable; and a limiting assembly. The base includes a base body and a through hole passing through the base body and having a circle shape. The first bearing is mounted in the through hole and forming a fixing connection with the base body. The turntable includes a turntable body and a shifting lever. The shifting lever rotates to the limiting portion until the limiting portion is pressed against and the limiting portion is driven to move, so that the limiting portion abuts against the limiting surface on the corresponding side to realize limiting. The limiting mechanism not only has fewer actions and has a simple structure, but also occupies a small space, has high reliability, and can reduce generation of noise.

10 Claims, 8 Drawing Sheets

N-N

N-N

FLEXIBLE LIMITING MECHANISM

TECHNICAL FIELD

The present disclosure relates to the technical field of turntable limiting, and in particular, to a flexible limiting mechanism.

BACKGROUND

With the rapid development of mechanical technologies, more and more industries begin to use turntables to realize mechanical rotation operations.

Currently, in turntables of the related art, there are relatively few ±180° (plus or minus 180°) rotation positioning structures, and most of the rotation positioning structures cannot simultaneously rotate and position structures at +180° and −180°, while rotation positioning structures in other applications adopt complex mechanical limiting such as screw positioning, matching of a follow-up slider with a bumper to cooperate with electrical limiting or software limiting to protect abnormal rotation of a rotating mechanism.

However, the above rotation positioning structures applied to turntables have many and complex actions, occupy a large space, and have relatively poor compatibility with various turntables, most of which only rely on the electrical limiting to achieve positioning of ±180° rotation, thereby having a potential risk of failure of electrical components and having low reliability in the application to the turntables.

Therefore, there is a need to provide a flexible limiting mechanism to solve the above problems.

SUMMARY

The technical problem to be solved in the present disclosure is how to provide a limiting structure with few actions, a simple structure, small space occupation, high reliability, and effective noise reduction.

In order to solve the above technical problem, the present disclosure provides a flexible limiting mechanism, for realizing limiting of 180° forward and reverse rotation. The flexible limiting mechanism includes: a base, a first bearing, a turntable, and a limiting assembly. The base includes a base body and a through hole passing through the base body and having a circle shape. The first bearing is mounted in the through hole and forming a fixing connection with the base body. The turntable includes a turntable body and a shifting lever. The turntable body is in a ring shape and is inserted into the first bearing to form a fixing connection with the first bearing. The shifting lever is formed by protruding from a periphery of the turntable body, a rotational connection between the turntable body and the base body is realized through the first bearing. The limiting assembly and the shifting lever are arranged on a same side of the base body. The limiting assembly includes a slider slidably arranged on the base body, a limiting portion formed by protruding from a side of the slider adjacent to the turntable, and two elastic members arranged along a sliding direction of the slider and respectively fixed to two ends of the slider. Respective ends of the two elastic members away from the slider are respectively fixedly connected to the base body. The limiting portion at an initial position and the shifting lever are located on a straight line of a diameter of the turntable body. The limiting portion is spaced apart from the turntable body; two opposite sides of the base body corresponding to the limiting portion along a circumferential direction thereof are respectively provided with limiting surfaces evenly spaced from the limiting portion. The shifting lever rotating clockwise or counterclockwise to the limiting portion until the limiting portion abuts against and the limiting portion is driven to move, so that the limiting portion abuts against the limiting surface on the corresponding side to realize limiting when the shifting lever rotates by 180°.

As an improvement, the base further includes a mounting groove recessed inwardly from the base body and having a circle shape, a sliding groove having a strip shape and recessed inwardly from the base body, and spaced apart from the mounting groove, and a connecting groove recessed inwardly from the base body and communicating the mounting groove with the sliding groove, the through hole is formed through the other side from a bottom of the mounting groove, the slider is slidably arranged in the sliding groove, and the limiting portion extends from the connecting groove to the mounting groove; and two opposite groove side surfaces of the connecting groove serve as the two limiting surfaces on the two opposite sides of the limiting portion.

As an improvement, the flexible limiting mechanism further includes a cover plate that covers the base body and completely covers the mounting groove, the sliding groove, and the connecting groove; and a perforation is formed at a position of the cover plate corresponding to the through hole.

As an improvement, two ends of the slider are respectively provided with guide grooves recessed inwardly, and the two elastic members are partially inserted into the two guide grooves, respectively, respectively.

As an improvement, the base body and the cover plate are respectively provided with fixing grooves recessed inwardly at positions corresponding to the respective ends of the two elastic members away from the slider, and the respective ends of the two elastic members away from the slider are respectively fixed to the corresponding fixing grooves.

As an improvement, a side of the slider adjacent to the cover plate abuts against the cover plate and is provided with a through groove recessed inwardly, the through groove extends along the sliding direction of the slider; and a side of the slider away from the cover plate is provided with a protruding portion abutting against a bottom of the sliding groove, and the protruding portion extends along the sliding direction of the slider.

As an improvement, the base body is provided with an inwardly recessed groove at a position corresponding to an edge of the cover plate; and the cover plate covers the groove and is fixed by a plurality of screws.

As an improvement, a surface of the slider is treated with diamond-like coating (DLC).

As an improvement, the turntable body includes a body portion having a ring shape and an extension portion protruding from an inner edge of the body portion along an axial direction thereof and having a tubular shape, the extension portion is inserted into and fixed to the first bearing; and the shifting lever is formed by protruding outwardly from a periphery of the body portion along a radial direction thereof.

As an improvement, each of the elastic members is a spring.

Compared with the related art, in the flexible limiting mechanism of the present disclosure, the shifting lever is arranged on the periphery of the turntable, the base body is provided with the limiting assembly formed by the slider slidably arranged on the base body, the limiting portion formed by protruding from the side of the slider adjacent to the turntable, and the two elastic members arranged along the sliding direction of the slider and respectively fixed to the two ends of the slider, the respective ends of the two elastic members away from the slider in the limiting assembly are respectively fixedly connected to the base body, and the two opposite sides of the base body corresponding to the limiting portion along the circumferential direction thereof are respectively provided with two limiting surfaces evenly spaced from the limiting portion. In this way, when the turntable rotates to nearly 180° and the shifting lever thereof presses against the limiting portion and drives the limiting portion to move, limiting can be realized by the limit portion abutting against the limiting surface on the corresponding side. That is, limiting of the turntable at 180° is realized. In the case of resetting, the shifting lever is disengaged from the limiting portion, the limiting portion may rebound under elastic forces of the elastic members on the two ends of the slider to realize resetting, and the slider may not move back and forth on the base body, so as to reduce generation of noise and have good stability. In addition, the flexible limiting mechanism of the present disclosure adopts mechanical limiting, which not only has few actions and a simple structure, but also occupies a small space and has high reliability.

BRIEF DESCRIPTION OF DRAWINGS

In order to more clearly illustrate the technical solutions in the embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

Figure 1:
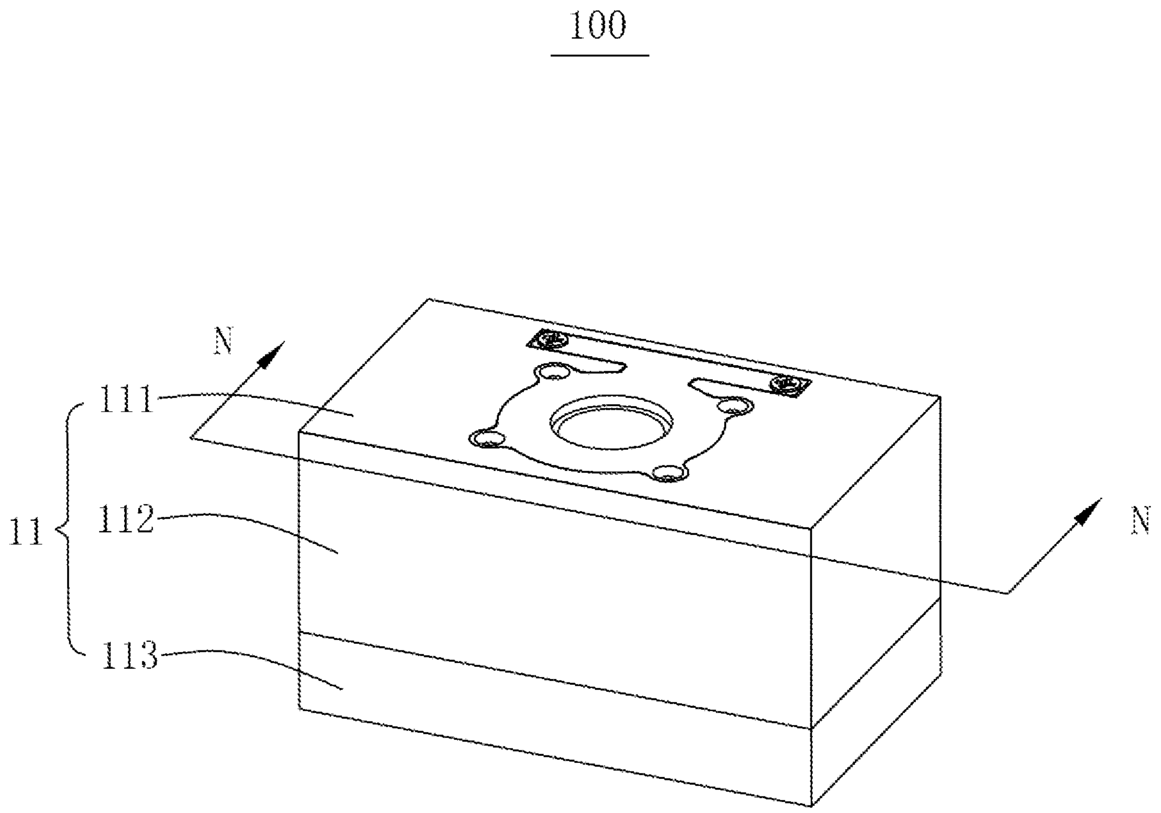
FIG. 1 is a perspective view of a flexible limiting mechanism according to an embodiment of the present disclosure.
Figure 2:
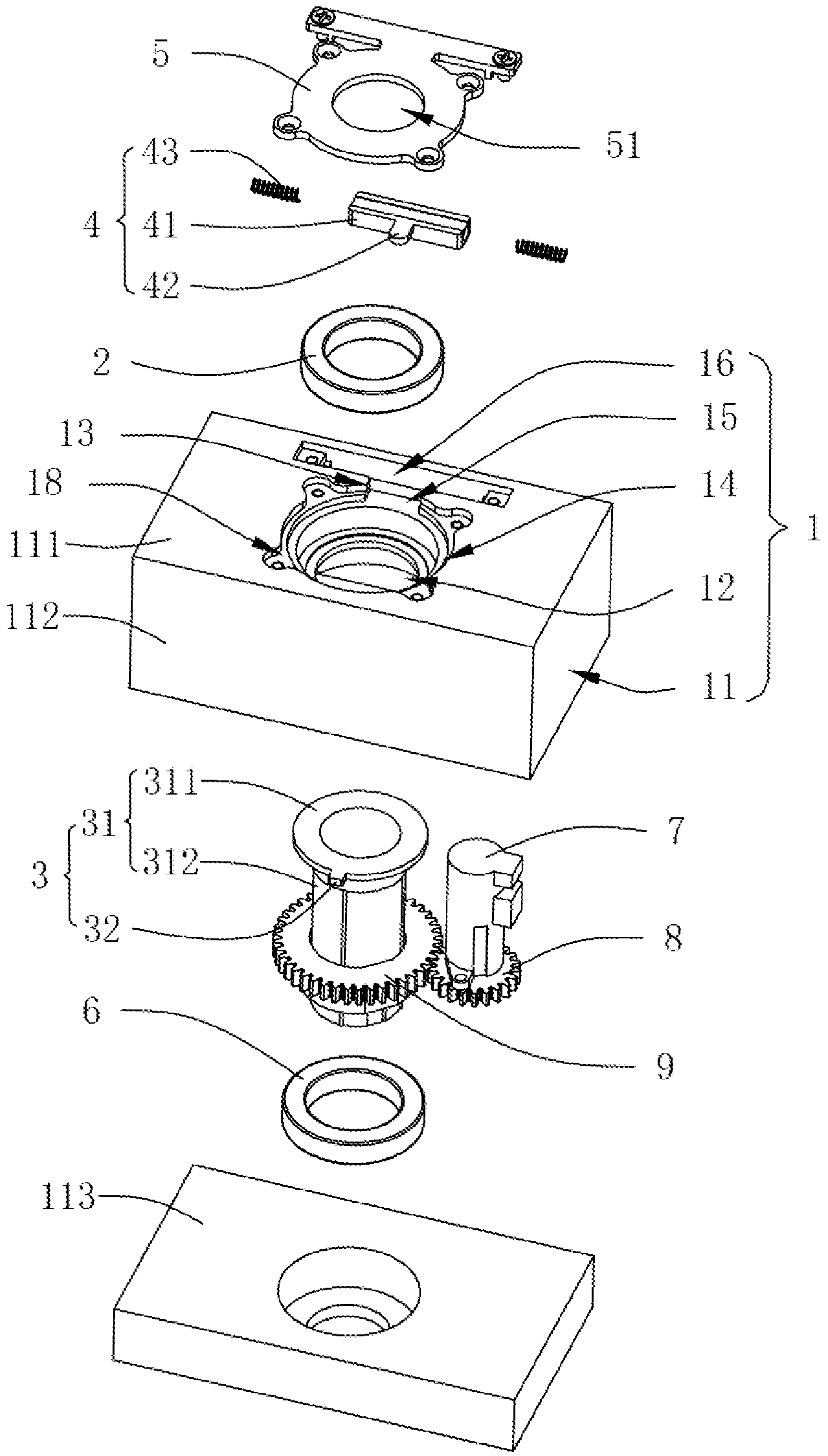
FIG. 2 is a schematic exploded view of an overall structure of a flexible limiting mechanism according to an embodiment of the present disclosure.
Figure 3:
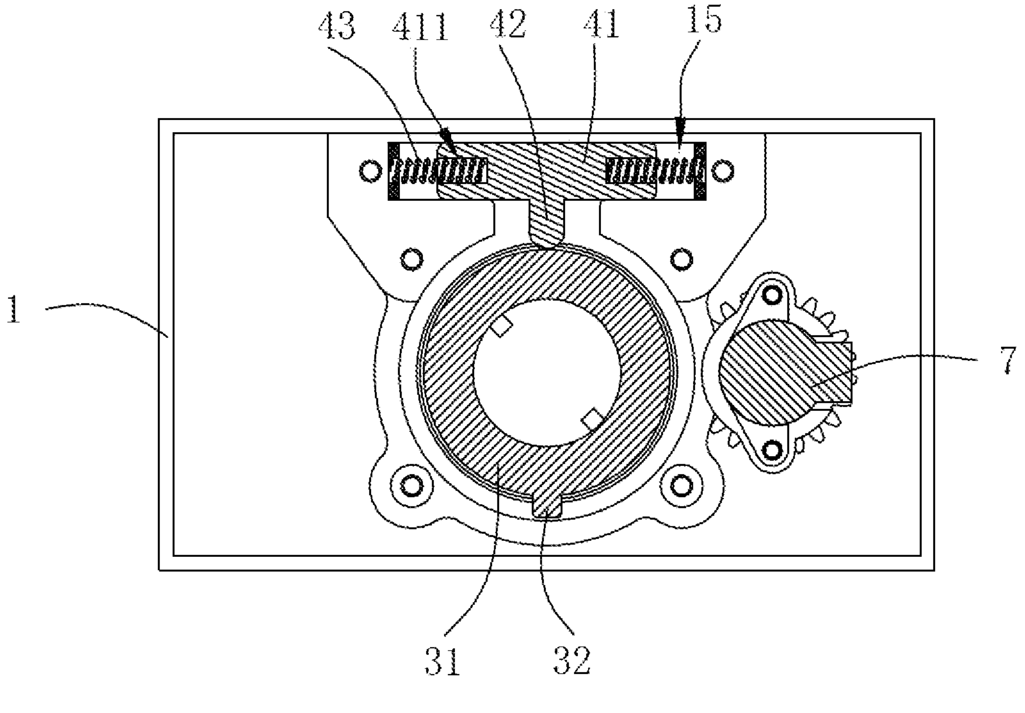
FIG. 3 is a sectional view taken along a line N-N of FIG. 1.
Figure 4:
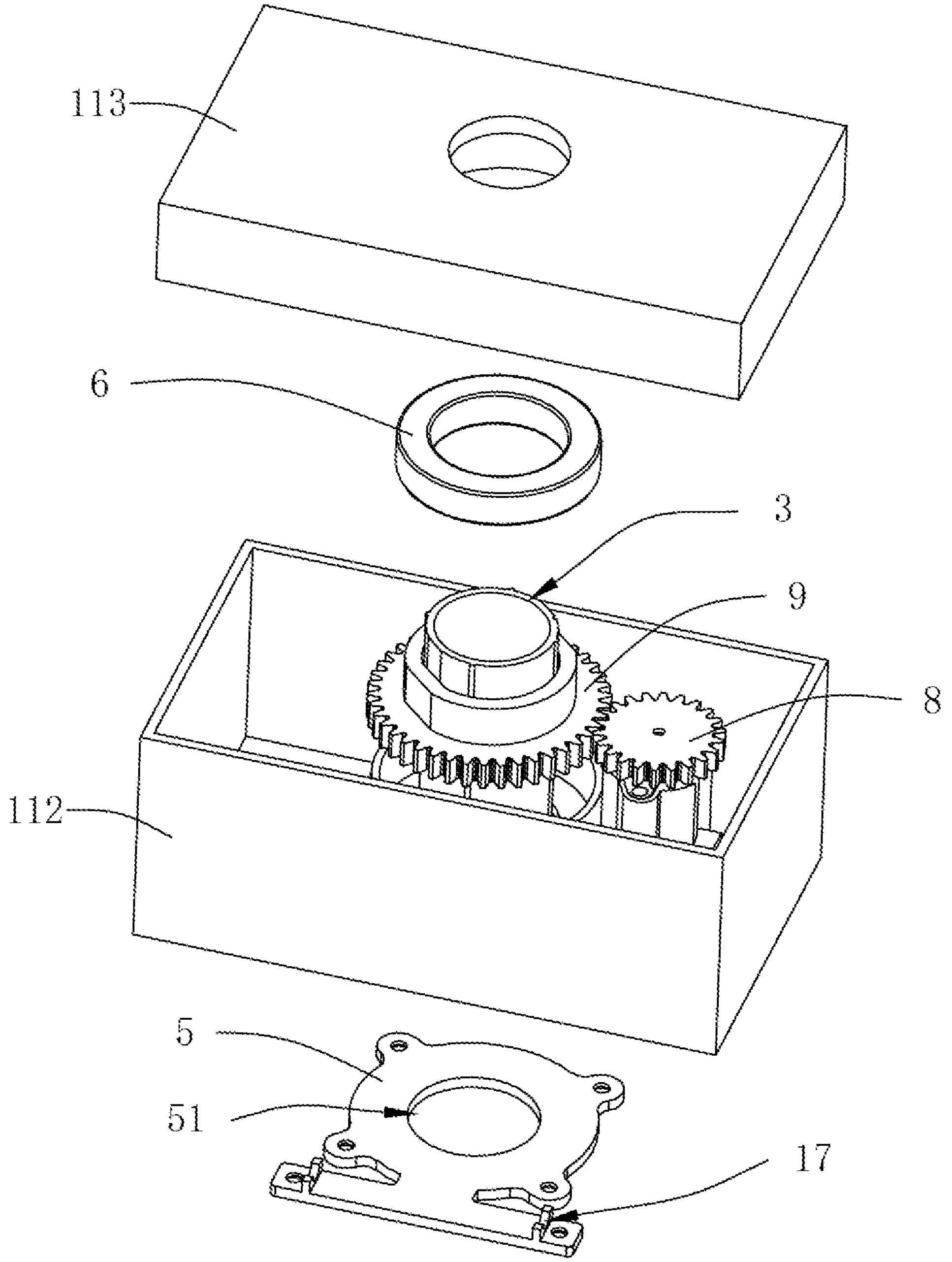
FIG. 4 is a schematic exploded view of a partial structure of a flexible limiting mechanism according to an embodiment of the present disclosure.
Figure 5:
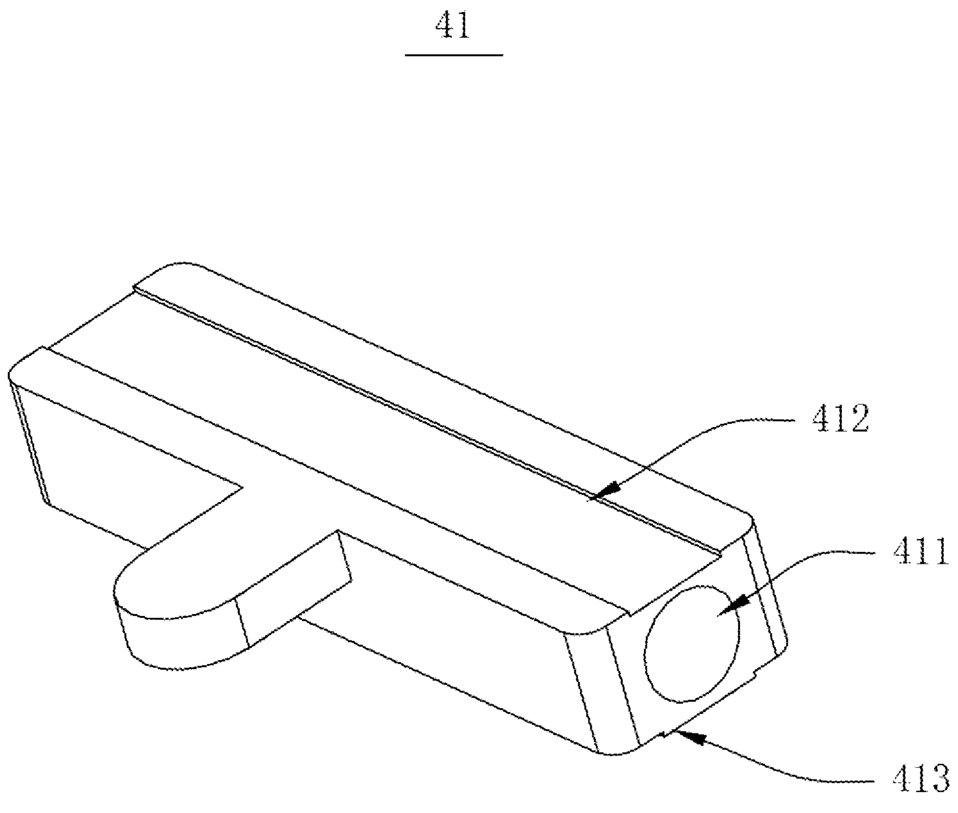
FIG. 5 is a schematic structural diagram of a slider in a flexible limiting mechanism according to an embodiment of the present disclosure.

In the drawings, 100: flexible limiting mechanism; 1: base; 11: base body; 111: bottom plate; 112: peripheral wall; 113: top plate; 12: through hole; 13: limiting surface; 14: mounting groove; 15: sliding groove; 16: connecting groove; 17: fixing groove; 18: groove; 2: first bearing; 3: turntable; 31: turntable body; 311: body portion; 312: extension portion; 32: shifting lever; 4: limiting assembly; 41: slider; 411: guide groove; 412: through groove; 413: protruding portion; 42: limiting portion; 43: elastic member; 5: cover plate; 51: perforation; 6: second bearing; 7: motor; 8: first gear; 9: second gear.

DESCRIPTION OF EMBODIMENTS

The technical solutions in the embodiments of the present disclosure will be clearly and completely described below with reference to the accompanying drawings in the embodiments of the present disclosure. Obviously, the described embodiments are only part of instead of all of the embodiments of the present disclosure. Based on the embodiments in the present disclosure, all other embodiments obtained by those of ordinary skill in the art without creative efforts fall within the protection scope of the present disclosure.

An embodiment of the present disclosure provides a flexible limiting mechanism 100, which, referring to FIG. 1 to FIG. 5, includes a base 1, a first bearing 2, a turntable 3, and a limiting assembly 4.

The flexible limiting mechanism 100 is configured to realize limiting of 180° forward and reverse rotation (clockwise or counterclockwise) of the turntable 3.

The base 1 includes a base body 11 and a through hole 12. The through hole 12 passes through the base body 11 and in a circle shape. The first bearing 2 is mounted in the through hole 12 and forms a fixing connection with the base body 11.

The turntable 3 includes a turntable body 31 and a shifting lever 32. The turntable body 31 is in a ring shape and is inserted into the first bearing 2 to form a fixing connection with the first bearing. The shifting lever 32 is formed by protruding from a periphery of the turntable body 31. The turntable body 31 realizes a rotational connection with the base body 11 through the first bearing 2.

The limiting assembly 4 and the shifting lever 32 are arranged on a same side of the base body 11. The limiting assembly 4 includes a slider 41 slidably arranged on the base body 11, a limiting portion 42 formed by protruding from a side of the slider 41 adjacent to the turntable 3, and two elastic members 43 arranged along a sliding direction of the slider 41 and respectively fixed to two ends of the slider 41. Respective ends of the two elastic members 43 away from the slider 41 are respectively fixedly connected to the base body 11. The limiting portion 42 at an initial position and the shifting lever 32 are located on a straight line of a diameter of the turntable body 31, and the limiting portion 42 is arranged apart from the turntable body 31. In addition, two opposite sides of the base body 11 corresponding to the limiting portion 42 along a circumferential direction thereof are respectively provided with limiting surfaces 13 evenly spaced from the limiting portion 42.

When the limiting portion 42 is at the initial position, that is, when the turntable 3 is at the initial position, the limiting portion 42 and the shifting lever 32 are respectively on two opposite sides of the turntable 3. When the shifting lever 32 rotates clockwise or counterclockwise to the limiting portion 42 until the limiting portion 42 is pressed against and the limiting portion 42 is driven to move, the limiting portion 42 abuts against the limiting surface 13 on the corresponding side to realize limiting when the shifting lever 32 rotates by 180°. When the shifting lever 32 is reset, that is, when the shifting lever 32 returns to the initial position, the shifting lever 32 is disengaged from the limiting portion 42, the limiting portion 42 may rebound under elastic forces of the elastic members 43 on the two ends of the slider 41 to realize resetting, and the slider 41 may not move back and forth on the base body 11, so as to reduce generation of noise and have good stability.

In this embodiment, the base 1 further includes a mounting groove 14 recessed inwardly from the base body 11 and in a circle shape, a sliding groove 15 recessed inwardly from the base body 11, spaced apart from the mounting groove 14, and in a strip shape, and a connecting groove 16 recessed inwardly from the base body 11 and communicated with the mounting groove 14 and the sliding groove 15, the through hole 12 is formed through the other side from a bottom of the mounting groove 14, the slider 41 is slidably arranged in the sliding groove 15, and the limiting portion 42 extends from the connecting groove 16 to the mounting groove 14. In this way, planes of the turntable 3, the slider 41, and the limiting portion 42 away from the base body 11 can be closer to a plane of the base body 11 or parallel to/lower than the plane of the base body 11, so as to reduce an overall height of the flexible limiting mechanism 100, which occupies a smaller space and has better adaptability.

Two opposite groove side surfaces of the connecting groove 16 serve as the two limiting surfaces 13 on the two opposite sides of the limiting portion 42. In this way, the overall height of the flexible limit mechanism 100 can be reduced, and formation of the limiting surface 13 is facilitated. Certainly, according to an actual requirement, the mounting groove 14, the sliding groove 15, and the connecting groove 16 may not be arranged, but the two opposite sides of the base body 11 corresponding to the limiting portion 42 along the circumferential direction thereof are required to be provided with convex structures protruded, so that planes of two opposite sides of the two convex structures corresponding to the limiting portion 42 form the limiting surfaces 13.

The slider 41 is kept in the middle of the sliding groove 15 by elastic forces of the two elastic members 43 when there is no external force. The slider 41 and the limiting portion 42 form a T-shaped structure. In this way, a posture of the slider 41 and the limiting portion 42 can be better controlled by two elastic members 43 of a same length, so as to prevent shaking of the two in the case of rebounding, so as to reduce wear caused by collision between the two and the base body 11 and reduce generation of noise.

A surface of the slider 41 is treated with diamond-like coating (DLC). In this way, hardness and wear resistance of the slider 41 can be effectively improved to reduce a coefficient of friction between the slider and the base body 11, thereby improving sliding performance of the slider 41 and reducing rotating torque of the turntable 3.

The elastic member 43 is a spring. Certainly, according to an actual requirement, a member with elastic recovery such as a C-shaped elastic piece or an S-shaped elastic piece may be alternatively selected as the elastic member 43.

The turntable body 31 includes a body portion 311 in a ring shape and an extension portion 312 protruding from an inner edge of the body portion 311 along an axial direction thereof and in a tubular shape. The extension portion 312 is inserted into and fixed to the first bearing 2. The shifting lever 32 is formed by protruding outwardly from a periphery of the body portion 311 along a radial direction thereof. In this way, the turntable 3 can have a hollow structure to facilitate a wiring harness to pass, preventing excessive twisting of the wiring harness caused by rotation of the turntable 3. The extension portion 312 is inserted into the first bearing 2 and then passes through the through hole 12.

In addition, the flexible limiting mechanism 100 further includes a cover plate 5 that covers the base body 11 and simultaneously completely covers the mounting groove 14, the sliding groove 15, and the connecting groove 16. A perforation 51 is formed at a position of the cover plate 5 corresponding to the through hole 12. In this way, the turntable 3 in the mounting groove 14, the slider 41 in the sliding groove 15, and the limiting portion 42 in the connecting groove 16 can be protected by the cover plate 5 to prevent potential safety hazards caused by exposure.

The base body 11 is provided with an inwardly recessed groove 18 at a position corresponding to an edge of the cover plate 5. The cover plate 5 covers the groove 18 and is fixed through a plurality of screws. In this way, a plane of the cover plate 5 away from the base body 11 can be closer to a plane of the base body 11 or parallel to/lower than the plane of the base body 11, so as to reduce an overall height of the flexible limiting mechanism 100, which occupies a smaller space and has better adaptability.

Two ends of the slider 41 are respectively provided with guide grooves 411 recessed inwardly, and the two elastic members 43 are partially inserted into the two guide grooves, respectively 411 on the two ends of the slider 41. The base body 11 and the cover plate 5 are respectively provided with inwardly recessed fixing grooves 17 at positions corresponding to the respective ends of the two elastic members 43 away from the slider 41, and the respective ends of the two elastic members 43 away from the slider 41 are respectively fixed to the corresponding fixing grooves 17. That is, the base body 11 is provided with two fixing grooves 17, and the cover plate 5 is provided with two fixing grooves 17. In this way, the elastic member 43 can be better fixed, and a guiding function can be provided for an operating path of the elastic member 43, which facilitates control over a posture of the elastic member 43, so as to improve operational efficiency of the elastic member 43.

A side of the slider 41 adjacent to the cover plate 5 abuts against the cover plate 5 and is provided with an inwardly recessed through groove 412. The through groove 412 extends along the sliding direction of the slider 41, is located in a middle region on a side surface of the slider 41, and at the same time, extends from one end of the slider 41 to the other end. In this way, a contact area between the slider 41 and the cover plate 5 can be effectively reduced to improve sliding efficiency of the slider 41.

A side of the slider 41 away from the cover plate 5 is provided with a protruding portion 413 abutting against a bottom of the sliding groove 15. The protruding portion 413 extends along the sliding direction of the slider 41, is located in the middle region on the side surface of the slider 41, and at the same time, extends from one end of the slider 41 to the other end. In this way, a contact area between the slider 41 and the sliding groove 15 can be effectively reduced to improve sliding efficiency of the slider 41.

In addition, the base body 11 includes a bottom plate 111, a peripheral wall 112 protruding from an outer peripheral edge of a side of the bottom plate 111 away from the turntable 3 in a direction away from the turntable 3 and in a ring shape, and a top plate 113 covering a side of the peripheral wall 112 away from the bottom plate 111. The through hole 12 passes through the bottom plate 111 and the top plate 113 in sequence. The first bearing 2 is arranged in the through hole 12 in the bottom plate 111. The limiting assembly 4 is arranged on a side of the bottom plate 111 away from the top plate 113. The extension portion 312 on the turntable body 31 passes through the through hole 12 in the bottom plate 111 to extend to the through hole 12 in the top plate 113.

The flexible limiting mechanism 100 further includes a through hole 12 mounted in the top plate 113, a second bearing 6 forming a fixing connection with the top plate 113, a motor 7 fixed to the side of the bottom plate 111 away from the turntable 3, a first gear 8 fixed to an output end of the motor 7, and a second gear 9 sleeving and fixed to the extension portion 312 and meshed with the first gear 8. An end of the extension portion 312 away from the turntable 3 is inserted into the second bearing 6 and forms a fixing connection therewith. The extension portion 312 realizes a rotational connection with the top plate 113 through the second bearing 6.

The flexible limiting mechanism 100 in this embodiment may be applied to mechanical structures that require rotation limiting, such as a robot turntable 3 and a rotating portion of a desktop fan.

In this embodiment, a principle of the flexible limiting mechanism 100 is as follows. When the turntable 3 rotates clockwise or counterclockwise until the shifting lever 32 on the turntable 3 contacts the limiting portion 42, since the limiting portion 42 is connected to the slider 41 and two ends of the slider 41 are provided with springs respectively, the shifting lever 32 may drive the limiting portion 42 and the slider 41 to move together until the limiting portion 42 abuts against the limiting surface 13 on the corresponding side, so that the limiting portion 42 cannot move and the corresponding shifting lever 32 cannot move either, thereby realizing limiting of rotation of the turntable 3 to 180°. When the turntable 3 is required to be reset, the shifting lever 32 may be disengaged from the limiting portion 42 and returns to the initial position, and the limiting portion 42 may rebound to the initial position under elastic forces of the springs at the two ends of the slider 41 to prepare for next limiting. Since the spring can control the posture of the slider 41 in a vibrating environment, the arrangement of the spring can prevent shaking of the slider 41 in the case of rebounding, so as to reduce collision wear caused by the rebound thereof and reduce generation of noise.

Figure 6:
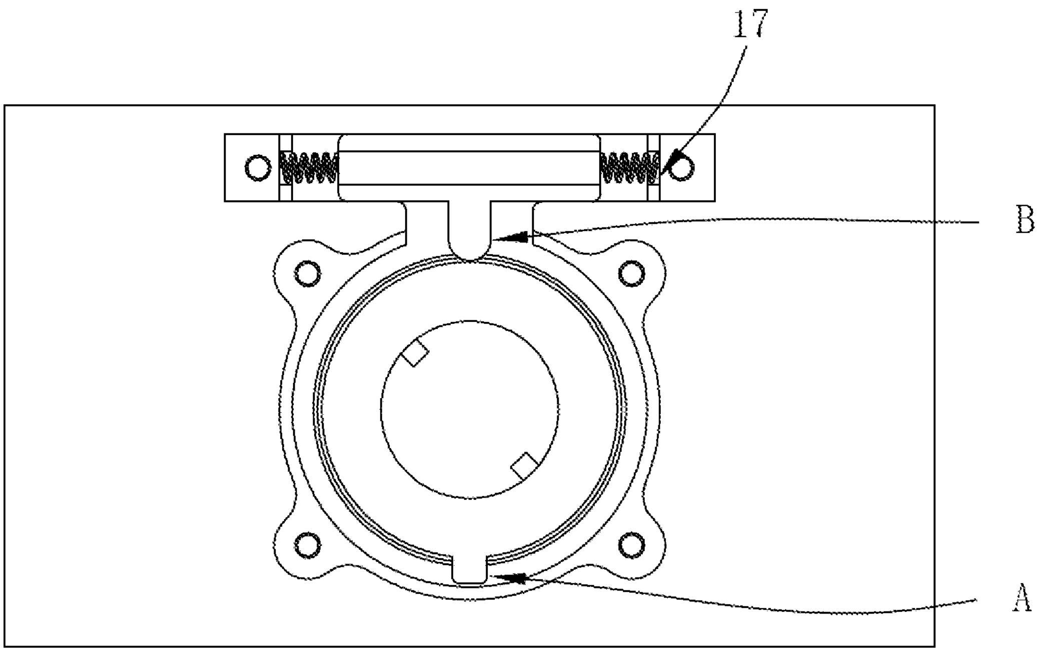
FIG. 6 is a schematic plan view when a turntable in a limiting mechanism according to an embodiment of the present disclosure is at an initial position.
Figure 7:
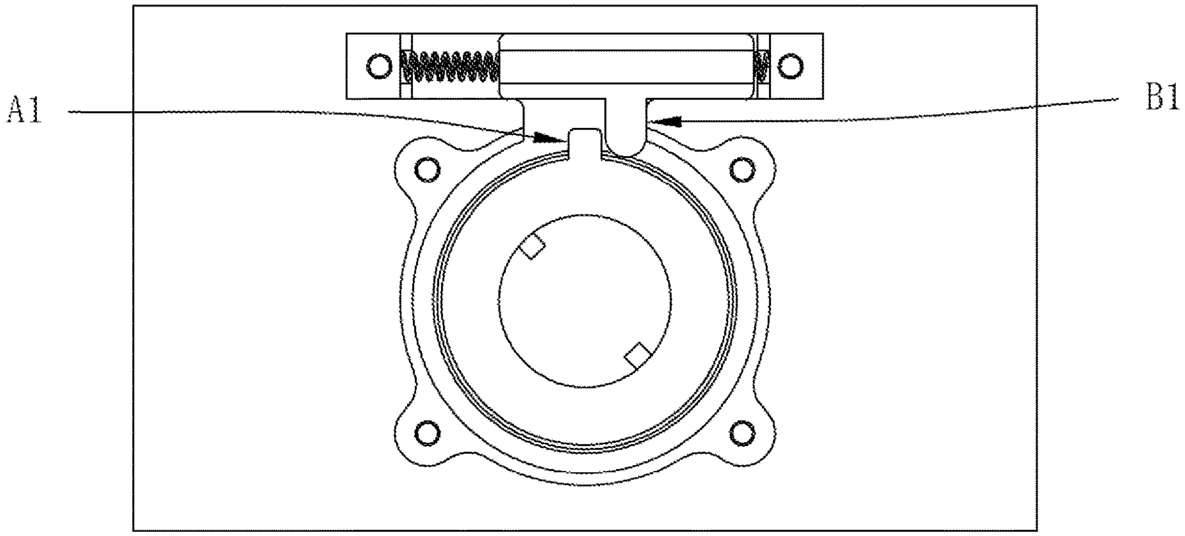
FIG. 7 is a schematic plan view when a turntable in a limiting mechanism according to an embodiment of the present disclosure rotates forward to 180° and is limited.
Figure 8:
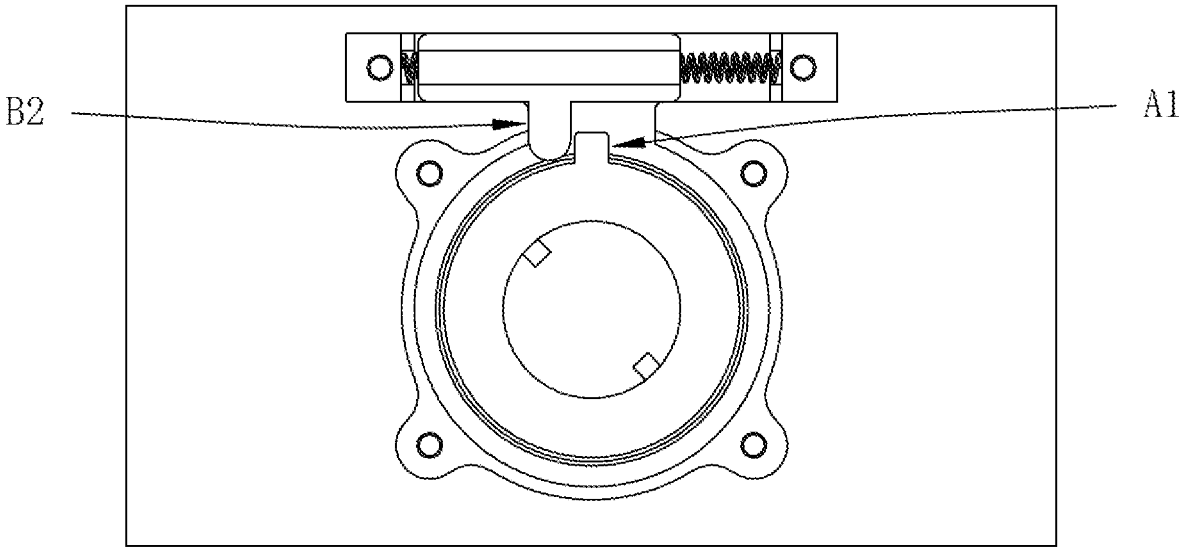
FIG. 8 is a schematic plan view when a turntable in a limiting mechanism according to an embodiment of the present disclosure rotates reversely to 180° and is limited.

Referring to FIG. 6 to FIG. 8, FIG. 6 is a schematic plan view when the turntable 3 in the flexible limiting mechanism 100 according to an embodiment is at the initial position, FIG. 7 is a schematic plan view when the turntable 3 in the flexible limiting mechanism 100 according to this embodiment rotates forward to 180° and is limited, and FIG. 8 is a schematic plan view when the turntable 3 in the flexible limiting mechanism 100 according to an embodiment rotates reversely to 180° and is limited. A specific limiting principle is as follows.

As shown in FIG. 6, when the turntable 3 is at the initial position, the shifting lever 32 of the turntable 3 is at a position A, and the limiting portion is at a position B under the interaction of the springs at the two ends of the slider 41.

As shown in FIG. 7, during 180° forward rotation (clockwise rotation) of the turntable 3, the limiting portion 42 is pushed by the shifting lever 32 to move from the position B to a position B1 and is prevented from moving right by the limiting surface 13 on the base body 11, the locking of the limiting portion 42 limits rotation of the shifting lever 32, that is, limits forward rotation of the turntable 3, so that the shifting lever 32 on the turntable 3 is at a position A1, thereby realizing limiting of 180° forward rotation of the turntable 3. During resetting of the turntable 3, that is, 180° reverse rotation, the shifting lever 32 is disengaged from the limiting portion 42, and the limiting portion 42 returns to the position B from the position B1 under the action of the springs at two ends thereof. In this process, the slider 41 may drive the limiting to return to the initial position.

As shown in FIG. 8, during 180° reverse rotation (counterclockwise rotation) of the turntable 3, the limiting portion 42 is pushed by the shifting lever 32 to move from the position B to a position B2 and is prevented from moving left by the limiting surface 13 on the base body 11, the locking of the limiting portion 42 limits rotation of the shifting lever 32, that is, limits reverse rotation of the turntable 3, so that the shifting lever 32 on the turntable 3 is at the position A1, thereby realizing limiting of 180° reverse rotation of the turntable 3. During resetting of the turntable 3, that is, 180° forward rotation, the shifting lever 32 is disengaged from the limiting portion 42, and the limiting portion 42 returns to the position B from the position B1 under the action of the springs at two ends thereof. In this process, the slider 41 may drive the limiting to return to the initial position.

Compared with the related art, in the flexible limiting mechanism 100 of this embodiment, the shifting lever 32 is arranged on the periphery of the turntable 3, the base body 11 is provided with the limiting assembly 4 formed by the slider 41 slidably arranged on the base body 11, the limiting portion 42 formed by protruding from the side of the slider 41 adjacent to the turntable 3, and the two elastic members 43 arranged along the sliding direction of the slider 41 and respectively fixed to the two ends of the slider 41, the respective ends of the two elastic members 43 away from the slider 41 in the limiting assembly 4 are respectively fixedly connected to the base body 11, and the two opposite sides of the base body 11 corresponding to the limiting portion 42 along the circumferential direction thereof are respectively provided with two limiting surfaces 13 evenly spaced from the limiting portion 42. In this way, when the turntable 3 rotates to nearly 180° and the shifting lever 32 thereof presses against the limiting portion 42 and drives the limiting portion 42 to move, limiting can be realized by the limit portion 42 abutting against the limiting surface 13 on the corresponding side. That is, limiting of the turntable 3 at 180° is realized. In the case of resetting, the shifting lever 32 is disengaged from the limiting portion 42, the limiting portion 42 may rebound under elastic forces of the elastic members 43 on the two ends of the slider 41 to realize resetting, and the slider 41 may not move back and forth on the base body 11, so as to reduce generation of noise and have good stability. In addition, the flexible limiting mechanism 100 of the present disclosure adopts mechanical limiting, which not only has few actions and a simple structure, but also occupies a small space and has high reliability.

The above description is only embodiments of the present disclosure. It should be pointed out herein that, for those of ordinary skill in the art, improvements can also be made without departing from the creative concept of the present disclosure, all of which fall within the protection scope of the present disclosure.

What is claimed is:

1. A flexible limiting mechanism for realizing limiting of 180° forward and reverse rotation, comprising:

a base comprising a base body and a through hole passing through the base body and having a circle shape;

a first bearing mounted in the through hole and forming a fixing connection with the base body;

a turntable comprising a turntable body and a shifting lever, wherein the turntable body is in a ring shape and is inserted into the first bearing to form a fixing connection with the first bearing, the shifting lever is formed by protruding from a periphery of the turntable body, a rotational connection between the turntable body and the base body is realized through the first bearing; and a limiting assembly, wherein the limiting assembly and the shifting lever are arranged on a same side of the base body; the limiting assembly comprises a slider slidably arranged on the base body, a limiting portion formed by protruding from a side of the slider adjacent to the turntable, and two elastic members arranged along a sliding direction of the slider and respectively fixed to two ends of the slider, respective ends of the two elastic members away from the slider are respectively fixedly connected to the base body, the limiting portion at an initial position and the shifting lever are located on a straight line of a diameter of the turntable body, and the limiting portion is spaced apart from the turntable body; two opposite sides of the base body corresponding to the limiting portion along a circumferential direction thereof are respectively provided with limiting surfaces evenly spaced from the limiting portion;

wherein the shifting lever rotating clockwise or counterclockwise to the limiting portion until the limiting portion abuts against and the limiting portion is driven to move, so that the limiting portion abuts against the limiting surface on the corresponding side to realize limiting when the shifting lever rotates by 180°.

2. The flexible limiting mechanism as described in claim 1, wherein the base further comprises a mounting groove recessed inwardly from the base body and having a circle shape, a sliding groove having a strip shape and recessed inwardly from the base body, and spaced apart from the mounting groove, and a connecting groove recessed inwardly from the base body and communicating the mounting groove with the sliding groove, the through hole is formed through the other side from a bottom of the mounting groove, the slider is slidably arranged in the sliding groove, and the limiting portion extends from the connecting groove to the mounting groove; and two opposite groove side surfaces of the connecting groove serve as the two limiting surfaces on the two opposite sides of the limiting portion.

3. The flexible limiting mechanism as described in claim 2, wherein the flexible limiting mechanism further comprises a cover plate that covers the base body and completely covers the mounting groove, the sliding groove, and the connecting groove; and a perforation is formed at a position of the cover plate corresponding to the through hole.

4. The flexible limiting mechanism as described in claim 3, wherein two ends of the slider are respectively provided with guide grooves recessed inwardly, and the two elastic members are partially inserted into the two guide grooves, respectively, respectively.

5. The flexible limiting mechanism as described in claim 4, wherein the base body and the cover plate are respectively provided with fixing grooves recessed inwardly at positions corresponding to the respective ends of the two elastic members away from the slider, and the respective ends of the two elastic members away from the slider are respectively fixed to the corresponding fixing grooves.

6. The flexible limiting mechanism as described in claim 4, wherein a side of the slider adjacent to the cover plate abuts against the cover plate and is provided with a through groove recessed inwardly, the through groove extends along the sliding direction of the slider; and a side of the slider away from the cover plate is provided with a protruding portion abutting against a bottom of the sliding groove, and the protruding portion extends along the sliding direction of the slider.

7. The flexible limiting mechanism as described in claim 4, wherein the base body is provided with an inwardly recessed groove at a position corresponding to an edge of the cover plate; and the cover plate covers the groove and is fixed by a plurality of screws.

8. The flexible limiting mechanism as described in claim 2, wherein a surface of the slider is treated with diamond-like coating (DLC).

9. The flexible limiting mechanism as described in claim 1, wherein the turntable body comprises a body portion having a ring shape and an extension portion protruding from an inner edge of the body portion along an axial direction thereof and having a tubular shape, the extension portion is inserted into and fixed to the first bearing; and the shifting lever is formed by protruding outwardly from a periphery of the body portion along a radial direction thereof.

10. The flexible limiting mechanism as described in claim 1, wherein each of the elastic members is a spring.

* * * * *